US012651047B1

(12) United States Patent
Nagalakshmi et al.

(10) Patent No.: US 12,651,047 B1
(45) Date of Patent: Jun. 9, 2026

(54) SECURE DISTRIBUTION AND MANAGEMENT OF LICENSES

(71) Applicant: Dell Products L.P., Round Rock, TX (US)

(72) Inventors: B R Nagalakshmi, Bylukoppa (IN); Vaneeswaran Natrayan, Erode (IN)

(73) Assignee: Dell Products L.P., Round Rock, TX (US)

( * ) Notice: Subject to any disclaimer, the term of this patent is extended or adjusted under 35 U.S.C. 154(b) by 67 days.

(21) Appl. No.: 18/974,531

(22) Filed: Dec. 9, 2024

(51) Int. Cl.
*H04L 29/06* (2006.01)
*G06F 21/10* (2013.01)
*H04L 9/08* (2006.01)

(52) U.S. Cl.
CPC ............ *G06F 21/107* (2023.08); *H04L 9/088* (2013.01)

(58) Field of Classification Search
CPC ... G06F 21/107; H04L 9/088; H04L 63/0263; H04L 63/20; H04L 9/0802; H04L 9/0813
See application file for complete search history.

(56) References Cited

U.S. PATENT DOCUMENTS 8,165,963 B2 * 4/2012 Foster ................ G06Q 20/3829
705/57
2009/0235363 A1 * 9/2009 Tomita .................... G06F 21/10
713/100

FOREIGN PATENT DOCUMENTS

WO       WO-2004063898 A2 *  7/2004  ............. H04N 5/913

* cited by examiner

*Primary Examiner* — Longbit Chai
(74) *Attorney, Agent, or Firm* — Chamberlain, Hrdlicka, White, Williams & Aughtry; Aly Z. Dossa

(57) ABSTRACT
A method for managing licensed content includes receiving an encrypted license file and a pre-shared key (PSK) from a deployment package and decrypting the encrypted license file using the PSK to obtain license file content. The method further includes sending the license file content to a secure license generator, obtaining a locking ID associated with an edge device, and encrypting the license file content using the locking ID to obtain a locking ID license file, wherein the locking ID is usable to access the locking ID license file. Finally, the method includes deleting the PSK and the encrypted license file, wherein, based on the deleting, the deployment package comprises a software product file and the locking ID license file.

20 Claims, 7 Drawing Sheets

Smart License Manager
202

Secure License Reader
204

Secure License Generator
206

Storage Device
208

Decryption Module
210

Encryption Device
200

SECURE DISTRIBUTION AND MANAGEMENT OF LICENSES

BACKGROUND

Software licenses are commonly granted to users, permitting access to software. These software licenses are often issued on a trial basis, giving the users a set period to use the software. It is important to secure software licenses to prevent malicious users from tampering with the access they provide.

DETAILED DESCRIPTION

Modern software (e.g., word processing software, artificial intelligence (AI) image generation software, video editing software, etc.) frequently requires software licenses to grant users access to the software package, and some software may be provided on a trial use basis to enable potential users to determine whether the software is useful for their particular needs. Such software licenses are traditionally limited in duration (e.g., a user may access the software for ninety days), use (i.e., the user may use a content feature within the software package ten times), and features (e.g., access to some features may be blocked depending on the type of license granted to the user). Further, software licenses are often paired with software keys comprising strings of cryptographic variables that the users use to verify ownership of the software license. However, traditional software licenses are not device-locked meaning that if a license is used on one device it can be used again on another device, giving malicious actors the opportunity to misuse software licenses.

As a result of the limitations of current systems discussed above, embodiments of the disclosure are directed to a method for encrypting software licenses on a device-by-device basis using a device's locking ID so that the software licenses can only be used on one device (i.e., the device with the locking ID that was used to encrypt the software licenses).

Specific embodiments will now be described with reference to the accompanying figures.

Figure 1:
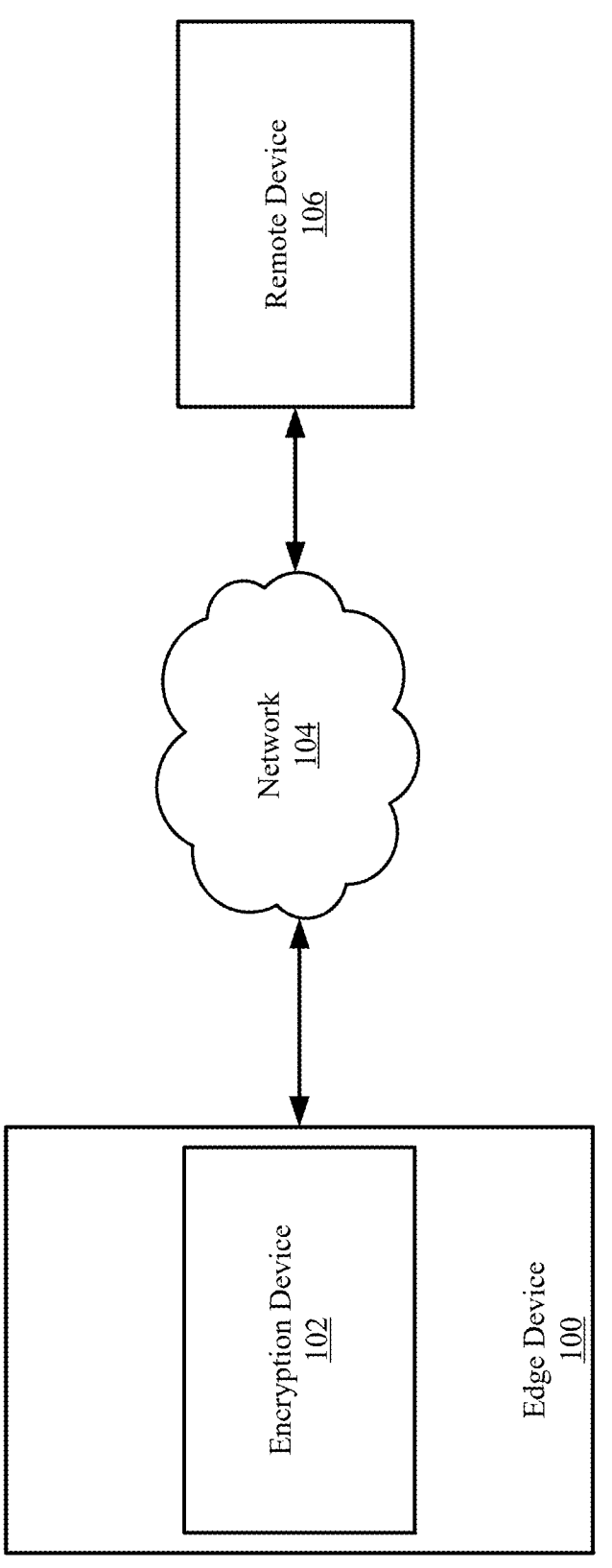
FIG. 1 shows a system in accordance with one or more embodiments.

FIG. 1 shows a system in accordance with one or more embodiments. The system may include an edge device (100), an encryption device (102), a network (104), and a remote device (106). The system may include additional, fewer, and/or different components without departing from the scope of the embodiments disclosed herein. Each component may be operably/operatively connected to any of the other components via any combination of wired and/or wireless connections. Each of these system components is described below.

In one or more embodiments, the edge device (100) may be a physical device such as a personal computing system (e.g., a laptop, a cell phone, a tablet computer, a server, etc.) configured for hosting one or more workloads, or for providing a computing environment whereon workloads may be implemented. For example, the edge device (100) may be a computing system (e.g., 700, FIG. 7) as discussed below in more detail in FIG. 7. In one or more embodiments, the edge device (100) may include a set of computing components, a storage device (e.g., 208 in FIG. 2), a processor (not shown), etc.). In one or more embodiments, the edge device (100) may include a user interface (e.g., a graphical user interface) (not shown) that allows a user to interact with the edge device (100) (e.g., accessing software associated with a software license). In one or more embodiments, the software licenses may refer to a license that provides access to software in accordance with the terms of a license agreement.

In one or more embodiments, the edge device (100) may include any number of applications (and/or content accessible through the applications) that provide computer-implemented services to a user. Applications may be designed and configured to perform one or more functions instantiated by a user of the edge device (100). In order to provide application services, each application may host similar or different components. The components may be, for example (but not limited to), instances of databases, instances of email servers, etc. Applications may be executed on one or more edge device(s) (100) as instances of the application. In one or more embodiments, access to the applications is granted via a software license.

Applications may vary in different embodiments, but in certain embodiments, applications may be custom developed or commercial (e.g., off-the-shelf) applications that a user desires to execute on the edge device (100). In one or more embodiments, applications may be logical entities executed using computing resources of the edge device (100). For example, applications may be implemented as computer instructions stored on persistent storage of the edge device (100) that when executed by the processor(s) of the edge device (100), cause the edge device (100) to provide the functionality of the applications described throughout the application.

In one or more embodiments, while performing, for example, one or more operations requested by a user, applications installed on the edge device (100) may include functionality to request and use physical and logical resources of the edge device (100). Applications may also include functionality to use data stored in storage/memory resources of the edge device (100). The applications may perform other types of functionalities not listed above without departing from the scope of the embodiments disclosed herein. While providing application services to a user, applications may store data that may be relevant to the user in storage/memory resources of the edge device (100).

In one or more embodiments, to provide services to the users, the edge device (100) may utilize, rely on, or otherwise cooperate with an infrastructure node IN (not shown). For example, the edge devices (100) may issue requests to the IN to receive responses and interact with various components of the IN. The edge device (100) may also request data from and/or send data to the IN (for example, the edge devices (100) may transmit information to the IN that allows the IN to perform computations, the results of which are used by the edge device (100) to provide services to the users). As yet another example, the edge device (100) may utilize computer-implemented services provided by the IN. When the edge devices (100) interact with the IN, data that is relevant to the edge device (100) may be stored (temporarily or permanently) in the IN.

In one or more embodiments, the edge device (100) may be capable of, for example: (i) collecting users' inputs, (ii) correlating collected users' inputs to the computer-implemented services to be provided to the users, (iii) communicating with IN that perform computations necessary to provide the computer-implemented services, (iv) using the computations performed by the infrastructure nodes to provide the computer-implemented services in a manner that appears (to the users) to be performed locally to the users, and/or (v) communicating with any virtual desktop (VD) in a virtual desktop infrastructure (VDI) environment (or a virtualized architecture) provided by the IN (using any known protocol in the art), for example, to exchange remote desktop traffic or any other regular protocol traffic (so that, once authenticated, users may remotely access independent VDs).

As described above, the edge devices (100) may provide computer-implemented services to users (and/or other computing devices). The edge devices (100) may provide any number and any type of computer-implemented services. To provide computer-implemented services, an edge device (100) may include a collection of physical components (e.g., processing resources, storage/memory resources, networking resources, etc.) configured to perform operations of the edge device (100) and/or otherwise execute a collection of logical components (e.g., virtualization resources) of the edge device (100).

Further, the edge device (100) may include functionality to perform at least a portion of the methods shown in FIGS. 3-6. One of ordinary skill in the art will appreciate that the edge device (100) may perform other functionalities without departing from the scope of the embodiment disclosed herein.

In one or more embodiments, the edge device (100), the encryption device (102), and the remote device (106) may be operatively connected to one another through the network (104) (e.g., a local area network (LAN), a wide area network (WAN) such as the Internet, a mobile network, any other network type, or a combination thereof). The network (104) may be implemented using any combination of wired and/or wireless connections. Further, the network (104) may encompass various interconnected, network-enabled subcomponents (or systems) (e.g., switches, routers, gateways, etc.) that may facilitate communications between the edge device (100), the encryption device (102), and the remote device (106). Moreover, the edge device (100), the encryption device (102), and the remote device (106) may communicate with one another using any combination of wired and/or wireless communication protocols.

In one or more embodiments, the encryption device (102) performs encryption operations, which include encryption and decryption, of a license file (i.e., a file containing a software license). In one or more embodiments, the encryption device (102) uses a pre-shared key (PSK) and a locking ID (i.e., an identifier unique to the edge device (100) such as the media access control (MAC) address) to encrypt and decrypt the license file. In one or more embodiments, the encryption device (102) employs any encryption and decryption techniques known in the art or discovered in the future. In one or more embodiments, the encryption device (102) may also manage consumption data (i.e., usage metrics of each content feature granted by the software license, with each content feature potentially subject to specific usage limits) and the duration data (i.e., information about the remaining time available on the software license). Further, the encryption device (102) may include functionality to perform at least a portion of the methods shown in FIGS. 3-6. One of ordinary skill in the art will appreciate that the encryption device (102) may perform other functionalities without departing from the scope of the embodiment disclosed herein.

In one or more embodiments, the remote device (106) may include any network-enabled device that is capable of establishing a connection to the edge device (100) via the network (104). Non-limiting examples of such devices may include servers, computing devices (e.g., 700 in FIG. 7), IoT devices, IT environments, or any other device that communicates with the edge device(s) (100) to exchange data, perform processing tasks, or interact with other network components. Additionally, in one or more embodiments, the remote device (106) may include any number and any configuration of IT sub-systems, including, but not limited to, an intelligent support bundle service. Further, in one or more embodiments, the remote device (106) may represent any IT environment where operations therein may be performed independently or asynchronous to any operations transpiring throughout the edge device (100). Moreover, the remote device (106) is responsible for preparing and providing the license file and deployment package to the edge device (100) to enable the edge device (100) to utilize the application. In one or more embodiments, the edge device (100) may obtain the license file and a deployment package from the remote device (106). In one or more embodiments, the deployment package refers to a bundle that includes at least one of, a software product file (i.e., a file containing software associated with the software license), the license file, a pre-shared key (PSK), and configuration tools (i.e., tools required to install, configure, and manage a specific system or application). In one or more embodiments, the PSK is unique to each deployment package. Further, the remote device (106) may include functionality to perform at least a portion of the methods shown in FIGS. 3-6. One of ordinary skill in the art will appreciate that the remote device (106) may perform other functionalities without departing from the scope of the embodiment disclosed herein.

Figure 4:
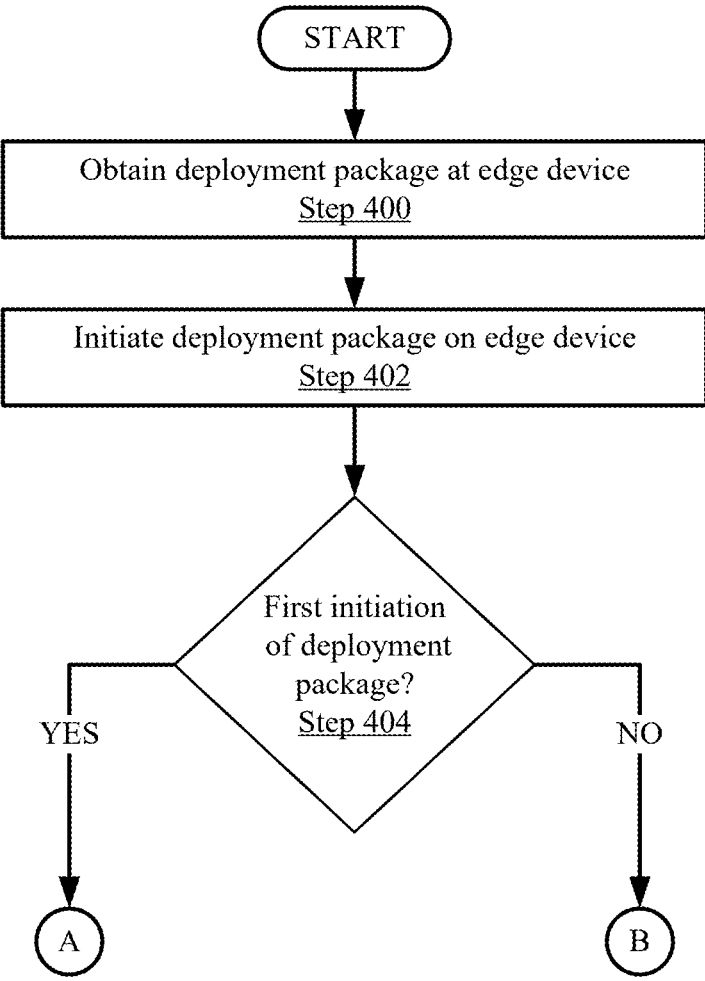
FIG. 4 shows a flowchart of a method for determining whether a deployment package has been initialized in accordance with one or more embodiments.

In one or more embodiments, the edge device (100), the encryption device (102), and the remote device (106) are each implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device cause the computing device to perform the functionality of the edge device (100), the encryption device (102), and the remote device (106) described throughout this application.

In one or more embodiments, the edge device (100), the encryption device (102), and the remote device (106) are each implemented as a logical device. The logical device may utilize the computing resources of any number of computing devices and thereby provide the functionality of the edge device (100), the encryption device (102), and the remote device (106).

Figure 2:
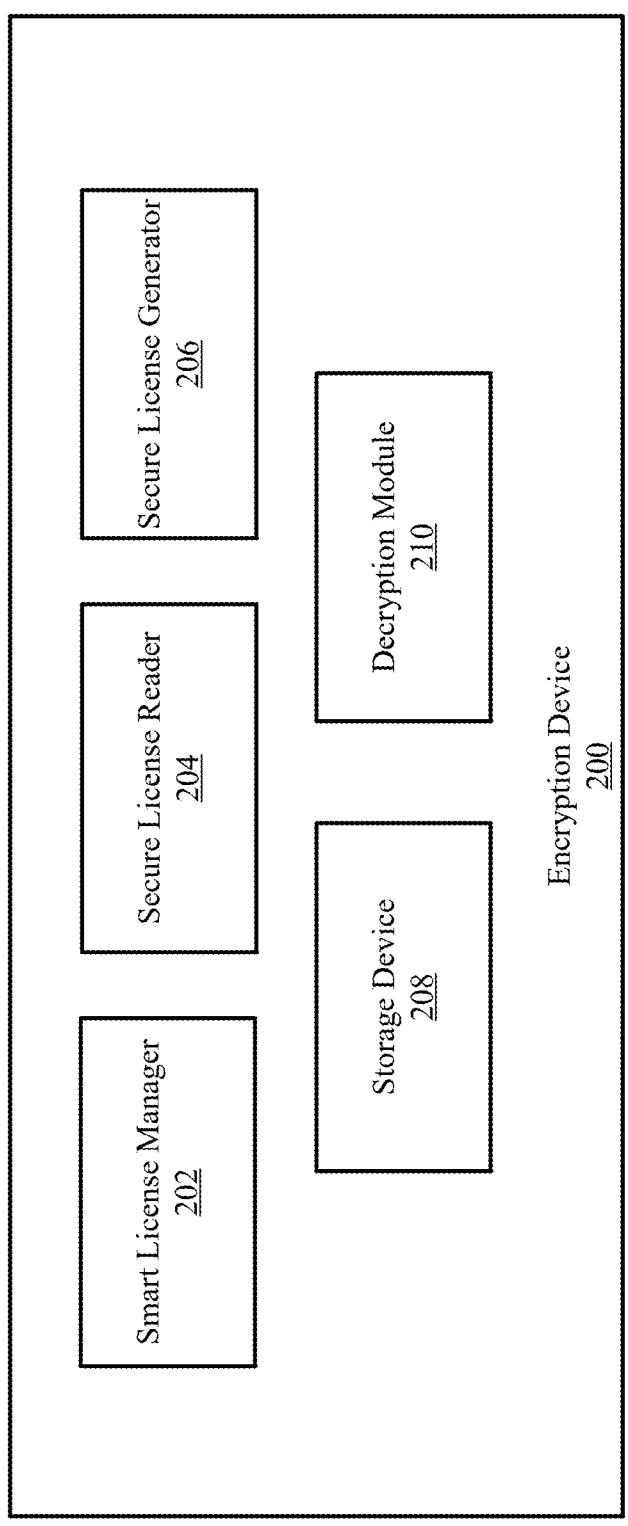
FIG. 2 shows an encryption device in accordance with one or more embodiments.

Turning to FIG. 2, FIG. 2 shows an encryption device (200) in accordance with one or more embodiments, which may be the same encryption device (e.g., 102 in FIG. 1) discussed above. More specifically, in one or more embodiments, the encryption device (200) includes a smart license manager (202), a secure license reader (204), a secure license generator (206), a storage device (208), and a decryption module (210). In one or more embodiments, the aforementioned components may be operably/operatively connected to any of the other aforementioned components via any combination of wired and/or wireless connections. In one or more embodiments, the components in FIG. 2 are used to perform at least a portion of the methods shown in FIGS. 3-6.

In one or more embodiments, the smart license manager (202) includes the functionality to monitor the initialization of the deployment package (i.e., determine whether the deployment package has been initialized before). In one or more embodiments, the smart license manager (202) may determine whether the deployment package has been initialized before by any means known in the art or discovered in the future. In one or more embodiments, initialization of the deployment package refers to the process of preparing the deployment package for deployment (e.g., unpacking the deployment package, encrypting the license file with an edge device's (e.g., 100 in FIG. 1) locking ID, etc.) as described below in FIG. 5. In one or more embodiments, the locking ID refers to the edge device's (e.g., 100 in FIG. 1) media access control (MAC) address. In one or more embodiments, the deployment package refers to a bundle that includes at least one of, a license file (i.e., a file containing a software license), a software product file (i.e., a file containing software associated with the software license), a pre-shared key (PSK), and configuration tools (i.e., tools required to install, configure, and manage a specific system or software), etc. Further, the smart license manager (202) may include functionality to perform at least a portion of the methods shown in FIGS. 3-6. One of ordinary skill in the art will appreciate that the smart license manager (202) may perform other functionalities without departing from the scope of the embodiment disclosed herein.

In one or more embodiments, the secure license reader (204) includes the functionality to retrieve license file content from the locking ID license file using the locking ID of the edge device (e.g., 100 in FIG. 1). In one or more embodiments, the license file is encrypted with the locking ID of the edge device (e.g., 100 in FIG. 1) to obtain the locking ID license file as described below in FIG. 5. In one or more embodiments, license file content refers to information about the software license including but not limited to a software license key (i.e., a cryptographic key used to verify ownership of the software license), consumption information, consumption data, duration data (i.e., how much time is left on the software license), software feature information (e.g., which features are usable and which features are not usable) etc. In one or more embodiments, consumption information refers to usage limits associated with content features provided by the software license (e.g., the user may generate ten images per software license). In one or more embodiments, consumption information refers to, usage metrics of each content feature granted by the software license, with each content feature potentially subject to specific usage limits outlined in the consumption information (e.g., generating five of ten artificial intelligence (AI) images, where ten is the max per license). Further, the secure license reader (204) may include functionality to perform at least a portion of the methods shown in FIGS. 3-6. One of ordinary skill in the art will appreciate that the secure license reader (204) may perform other functionalities without departing from the scope of the embodiment disclosed herein.

In one or more embodiments, the secure license generator (206) includes the functionality to encrypt the license file content with the edge device's (e.g., 100 in FIG. 1) locking ID to obtain the locking ID license file. In one or more embodiments, the secure license generator (206) may use a standard encryption library, publicly available encrypted stores, or any other encryption library to encrypt the license file content. Further, the secure license generator (206) may include functionality to perform at least a portion of the methods shown in FIGS. 3-6. One of ordinary skill in the art will appreciate that the secure license generator (206) may perform other functionalities without departing from the scope of the embodiment disclosed herein.

In one or more embodiments, the storage device (208) includes the functionality to store data (e.g., consumption data, duration data, etc.). The storage device (208) may utilize volatile storage, non-volatile storage, or any combination thereof. Examples of storage include (but are not limited to): a hard disk drive (HDD), a solid-state drive (SSD), random access memory (RAM), flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, and virtualized memory. In one or more embodiments, the storage device (208) may be operably connected to the edge device (100). Further, the storage device (208) may include functionality to perform at least a portion of the methods shown in FIGS. 3-6. One of ordinary skill in the art will appreciate that the storage device (208) may perform other functionalities without departing from the scope of the embodiment disclosed herein.

In one or more embodiments, the decryption module (210) includes the functionality to decrypt an encrypted license file (i.e., a license file that has been encrypted with the PSK) using the PSK. In one or more embodiments, the decryption module (210) may decrypt the encrypted license file by any means known in the art or discovered in the future. It should further, the decryption module (210) may include functionality to perform at least a portion of the methods shown in FIGS. 3-6. One of ordinary skill in the art will appreciate that the decryption module (210) may perform other functionalities without departing from the scope of the embodiment disclosed herein.

In one or more embodiments, the encryption device (200), the smart license manager (202), the secure license reader (204), the secure license generator (206), the storage device (208), and the decryption module (210) are each implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid-state drives, etc.). The computing device may include instructions, stored on the persistent storage, that when executed by the processor(s) of the computing device cause the computing device to perform the functionality of the encryption device (200), the smart license manager (202), the secure license reader (204), the secure license generator (206), the storage device (208), and the decryption module (210) described throughout this application.

In one or more embodiments, the encryption device (200), the smart license manager (202), the secure license reader (204), the secure license generator (206), the storage device (208), and the decryption module (210) are each implemented as a logical device. The logical device may utilize the computing resources of any number of computing devices and thereby provide the functionality of the encryption device (200), the smart license manager (202), the secure license reader (204), the secure license generator (206), the storage device (208), and the decryption module (210).

Figure 3:
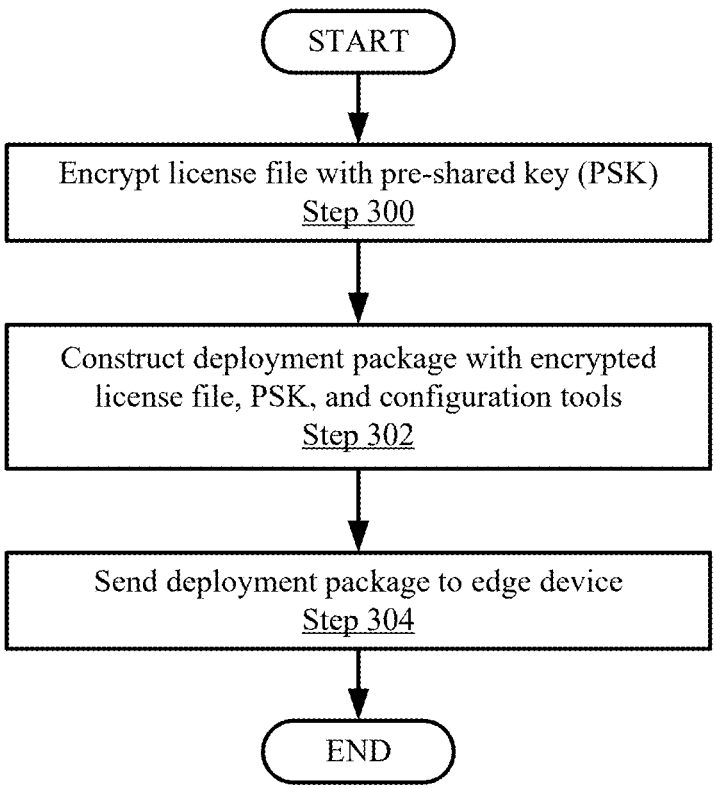
FIG. 3 shows a flowchart of a method for generating a deployment package in accordance with one or more embodiments.

Turning to FIG. 3, FIG. 3 shows a flowchart of a method for generating a deployment package in accordance with one or more embodiments disclosed herein. The method may be performed by, for example, the remote device (e.g., 106 in FIG. 1). Other components in the system may perform this method without departing from the scope of the disclosure.

In step 300, a license file (i.e., a file containing a software license) is encrypted with a pre-shared key (PSK) using the remote device. In one or more embodiments, the PSK is unique to each deployment package. In one or more embodiments, the PSK may include a unique string of characters and/or cryptographic variables. In one or more embodiments, the license file may be encrypted by any means known in the art or discovered in the future.

In step 302, a deployment package is constructed by bundling a software product file (i.e., a file containing software associated with the software license), the encrypted license file, the PSK, and configuration tools (i.e., tools required to install, configure, and manage a specific system or software). In or more embodiments, the deployment package may be constructed by any means known in the art or discovered in the future.

In step 304, the deployment package is sent to an edge device (e.g., 100 in FIG. 1). In one or more embodiments, the deployment package may be sent to the edge device (e.g., 100 in FIG. 1) by any means known in the art or discovered in the future.

In one or more embodiments, the method may end following step 304.

Turning to FIG. 4, FIG. 4 shows a flowchart of a method for determining whether a deployment package has been initialized in accordance with one or more embodiments disclosed herein. The method may be performed by, for example, an edge device (e.g., 100 in FIG. 1). Other components in the system may perform this method without departing from the scope of the disclosure.

In step 400, a deployment package is obtained at the edge device (e.g., 100 in FIG. 1). In one or more embodiments, the edge device (e.g., 100 in FIG. 1) may obtain the deployment package by any means known in the art or discovered in the future including but not limited to downloading it from a remote device (e.g., 106 in FIG. 1), downloading it from a removable device (not shown), etc. In one or more embodiments, the deployment package refers to a bundle that includes at least one of, a software product file (i.e., a file containing software associated with the software license), the license file (i.e., a file containing software license), a pre-shared key (PSK), and configuration tools (i.e., tools required to install, configure, and manage a specific system or application).

In step 402, the deployment package is initiated on the edge device (e.g., 100 in FIG. 1). In one or more embodiments, initialization of the deployment package refers to the process of preparing the deployment package for deployment (i.e., unpacking the deployment package to begin using the software product file associated with the license file).

In step 404, a smart license manager (e.g., 202 in FIG. 2) determines whether the initiation of the deployment package in step 402 was the first initiation of the deployment package. Accordingly, if the result of this determination is YES, the method proceeds to step 500 in FIG. 5. If the result of the determination is NO, the method proceeds to step 600 in FIG. 6. In a non-limiting example, if the license file has already been encrypted with the edge device's (e.g., 100 in FIG. 1) locking ID (i.e., the media access control (MAC) address of the edge device (e.g., 100 in FIG. 1), then the deployment package has previously been initialized.

Figure 5:
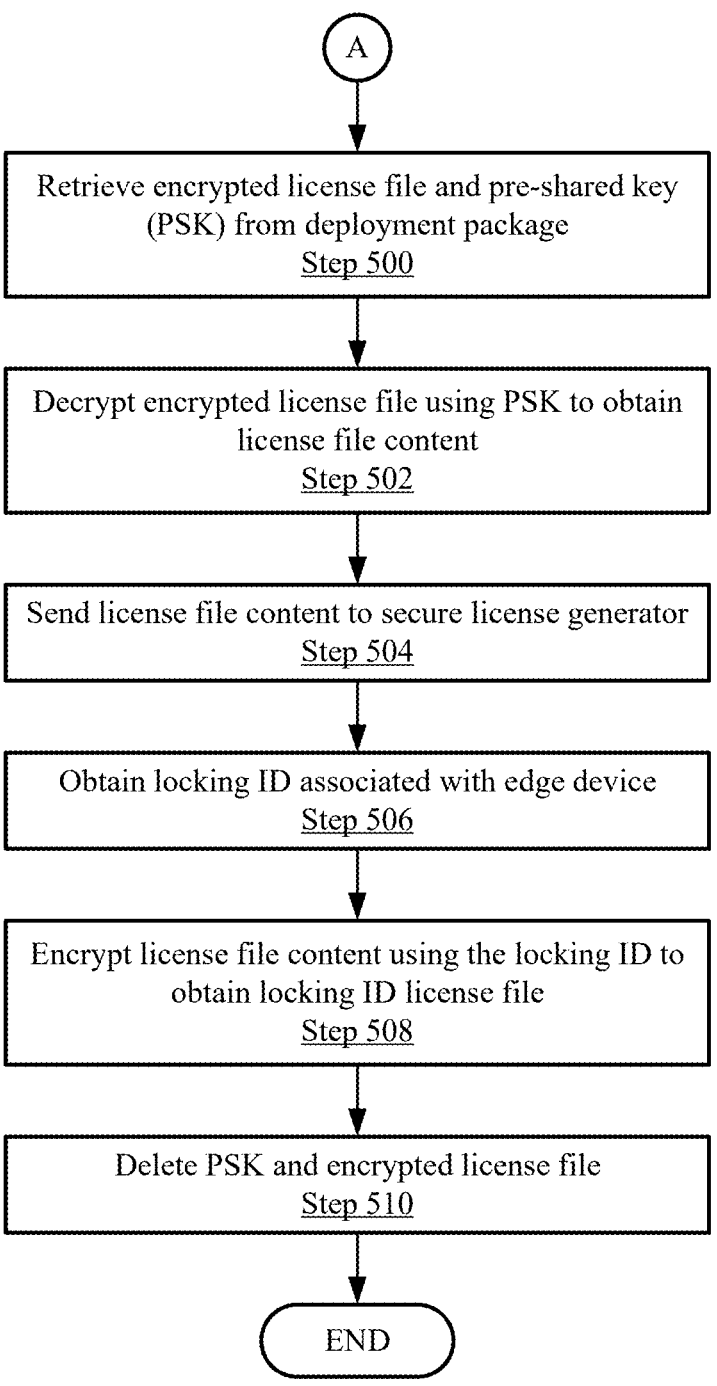
FIG. 5 shows a flowchart of a method for generating a device-specific encrypted file in accordance with one or more embodiments.

Turning to FIG. 5, FIG. 5 shows a flowchart of a method for generating a device-specific encrypted file in accordance with one or more embodiments. The method may be performed by, for example, an edge device (e.g., 100 in FIG. 1). Other components in the system may perform this method without departing from the scope of the disclosure.

In step 500, a decryption module (e.g., 210 in FIG. 2) retrieves a software product file (i.e., a file containing software associated with the software license), an encrypted license file and a pre-shared key (PSK) from a deployment package. In one or more embodiments, the deployment package is the same deployment package from FIG. 3 In one or more embodiments, the encrypted license file is encrypted with the PSK. In one or more embodiments, the PSK is the same PSK from FIG. 3.

In step, 502 the decryption module (e.g., 210 in FIG. 2) decrypts the encrypted license file using the PSK from the deployment package to get license file content. In one or more embodiments, license file content refers to information about the software license including but not limited to a software license key (i.e., a cryptographic key used to verify ownership of the software license), consumption information, consumption data, duration data (i.e., how much time is left on the software license), etc.). In one or more embodiments, consumption information refers to usage limits associated with content features provided by the software license (e.g., the user may generate ten images per software license). In one or more embodiments, consumption information refers to, usage metrics of each content feature granted by the software license, with each content feature potentially subject to specific usage limits outlined in the consumption information (e.g., generating five of ten artificial intelligence (AI) images, where ten is the max per license). In one or more embodiments, the usage limit may be regulated by any means known in the art or discovered in the future including but not limited to a per-license basis (e.g., ten uses per software license), time-based (e.g., 10 uses per hour), a combination thereof, etc.

In step 504, the decryption module (e.g., 210 in FIG. 2) sends the license file content to a secure license generator (e.g., 206 in FIG. 2). In one or more embodiments, the license file content may be sent to the secure license generator (e.g., 206 in FIG. 2) by any means know in the art or discovered in the future.

In step 506, the secure license generator (e.g., 206 in FIG. 2) obtains a locking ID from the edge device (e.g., 100 in FIG. 1) using a form of identification that is unique to the edge device. In one or more embodiments, the locking ID is the edge device's (e.g., 100 in FIG. 1) media access control (MAC) address. It should be appreciated, that locking ID may be obtained by any means known in the art or discovered in the future.

In step 508, the secure licenses generator (e.g., 206 in FIG. 2) encrypts the license file content with the locking ID to obtain a locking ID license file. It should be appreciated, that this will only allow the edge device (e.g., 100 in FIG. 1) with a matching locking ID, to decrypt the locking ID license file. In one or more embodiments, the secure license generator (e.g., 206 in FIG. 2) encrypts the license file content and stores the encrypted file content in a secure storage, such as a lockbox or vault. In one or more embodiments, the secure storage operates in a two-factor mode, where the locking ID is used as a passphrase and generated values (e.g., system stable values (SSVs) are used as a fingerprint (i.e., a unique cryptographic identifier derived from stable hardware and software attributes unique to the edge device (e.g., 100 in FIG. 1)) ensuring that the secure storage is only accessible by the edge device (e.g., 100 in FIG. 1)). In one or more embodiments, the SSVs are stored as a file on the edge device (e.g., 100 in FIG. 1). In one or more embodiments, a preprocessed code is used to juggle the SSVs and the locking ID in a predefined order (i.e., frequently rotating SSVs and locking ID values to add another layer of security) to generate an encryption key. In one or more embodiments, the license file content is sent to the secure storage where it is encrypted with the encryption key to obtain a locking ID encrypted file. In one or more embodiments, the preprocessed code is stored on the edge device (e.g., 100 in FIG. 1). It should be appreciated, that the SSV, the locking ID, and the pre-processed code are only accessible by the edge device (e.g., 100 in FIG. 1). It should be further appreciated, that even if a malicious user has access to the SSVs, the locking ID, and the secure storage, they will not be able to access the license file content in the secure storage unless they have access to the preprocessed code on the edge device (e.g., 100 in FIG. 1). In one or more embodiments, the secure licenses generator (e.g., 206 in FIG. 2) may also use a standard encryption library, publicly available encrypted stores, or any other encryption library to encrypt the license file content with the locking ID. In one or more embodiments, a user is notified via a graphical user interface (GUI) once the license file content has been encrypted. In one or more embodiments, a secure license reader (e.g., 204 in FIG. 2) is used to access the license file content encrypted in the locking ID license file as shown below in FIG. 6.

In step 510, the PSK and encrypted license file are deleted from the deployment package. It should be appreciated, that a user with the PSK and the encrypted license file will be able to access the license file content thus, it is important that the PSK and the encrypted license file are deleted after the locking ID license file is created. For example, if the PSK and the encrypted license file are still in the deployment package after the locking ID license file has been created, a malicious user may attempt to gain access to the deployment package to decrypt and use the license file content for unauthored purposes. In one or more embodiments, the user may be notified via a GUI if another user tries to access the deployment package before or after the locking ID file has been created.

In one or more embodiments, the method may end following step 510.

Figure 6:
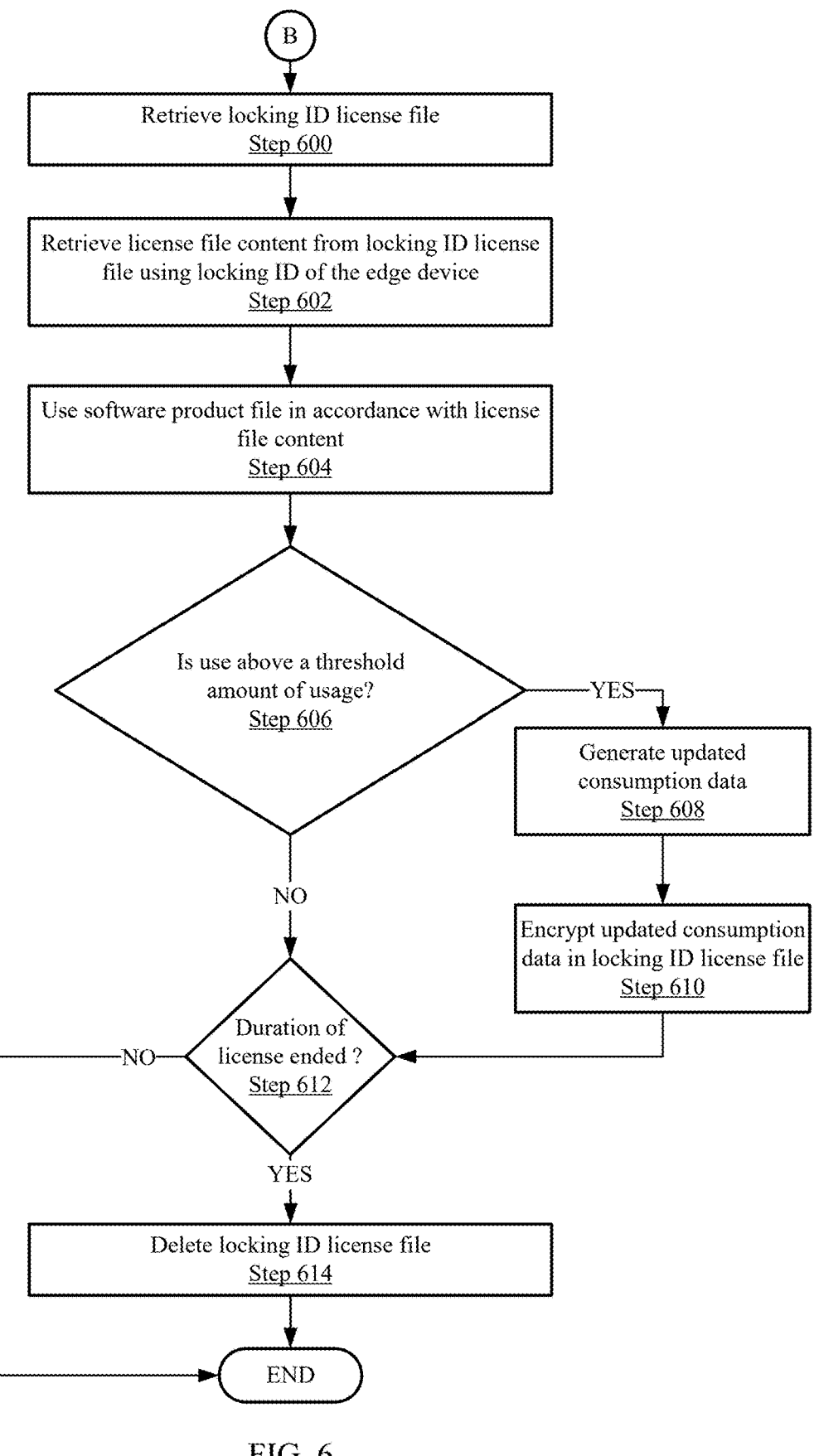
FIG. 6 shows a flowchart of a method for updating and encrypting consumption data in accordance with one or more embodiments.

Turning to FIG. 6, FIG. 6 shows a flowchart of a method for updating and encrypting consumption data in accordance with one or more embodiments. The method may be performed by, for example, an edge device (e.g., 100 in FIG. 1).

Other components in the system may perform this method without departing from the scope of the disclosure.

In step 600, a secure license reader (e.g., 204 in FIG. 2) receives a locking ID license file from the edge device (e.g., 100 in FIG. 1). In one or more embodiments, the locking ID license file may be obtained by any means known in the art or discovered in the future.

In step 602, a secure license reader (e.g., 204 in FIG. 2) retrieves license file content from the locking ID license file using the edge device's (e.g., 100 in FIG. 1) locking ID. In one or more embodiments, the secure license reader (e.g., 204 in FIG. 2) retrieves license file content using a decryption method corresponding to the encryption method used to create the locking ID license file as discussed above in FIG. 5. Assuming that the secure storage, was used to encrypt the license file content, the secure license reader (e.g., 204 in FIG. 2) uses the edge device' (e.g., 100 in FIG. 1) locking ID, SSVs, and preprocessed code to create an encrypted key. The encryption key is then used to decrypt the secure storage to grant access to the license file content. It should be appreciated, as discussed above in FIG. 5, that the secure storage can only be decrypted if one has access to the correct SSV, locking ID, and pre-processed code, all of which are tied to the edge device (e.g., 100 in FIG. 1). In one or more embodiments, license file content refers to information about the software license including but not limited to a software license key (i.e., a cryptographic key used to verify ownership of the software license), consumption information, consumption data, duration data (i.e., how much time is left on the software license), etc.). In one or more embodiments, consumption information refers to usage limits associated with content features provided by the software license (e.g., the user may generate ten images per software license). In one or more embodiments, consumption information refers to, usage metrics of each content feature granted by the software license, with each content feature potentially subject to specific usage limits outlined in the consumption information (e.g., generating five of ten artificial intelligence (AI) images, where ten is the max per license.

In step 604, the user uses the software associated the software license on the edge device (e.g., 100 in FIG. 1). In one or more embodiments, the user may access the software via a graphical user interface (GUI) on the edge device (e.g., 100 in FIG. 1). In one or more embodiments, the software may include but should not be limited to, a word processor, an AI image generator, a video game, etc. It should be appreciated, that using the software may include using at least one content feature granted by the software license (e.g., generating AI images).

In step 606, the encryption device (e.g., 200 in FIG. 2) determines whether the usage limit has been reached on any content features granted by the software license. A non-limiting example of reaching the usage limit may include generating ten artificial AI images with an AI image generator, where ten images are the max per software license. In one or more embodiments, the usage limit may also refer to a threshold amount of usage (i.e., using 80 percent of the usage limit of a content feature). In one or more embodiments, the user may be notified via GUI that the usage limit has been reached or that the threshold amount has been reached. In one or more embodiments, the encryption device (e.g., 200 in FIG. 2) is constantly monitoring consumption data to determine if any usage limits have been reached. In one or more embodiments, the encryption device (e.g., 200 in FIG. 2) may determine whether the usage limit has been reached by any means known in the art or discovered in the future. Accordingly, if the result of this determination is YES, the method proceeds to step 608. If the result of the determination is NO, the method proceeds to step 612.

In step 608, after the encryption device (e.g., 200 in FIG. 2) determines that the usage limit has been reached on at least one content feature, the consumption data is updated in memory of a storage device (e.g., 208 in FIG. 2) to reflect that the usage limit has been reached. In one or more embodiments, the consumption data may be updated any time that the consumption data changes or if a threshold amount of usage is reached. It should be appreciated, that the consumption data is updated in the memory to prevent the user from exceeding the use limit of any of the content features granted by the software license.

In step 610, the secure license generator (e.g., 206 in FIG. 2) encrypts updated consumption data in the locking ID encrypted file. In one or more embodiments, the secure license generator (e.g., 206 in FIG. 2) encrypts the consumption data using one of the methods described above in FIG. 5. It should be appreciated, that the secure license generator (e.g., 206 in FIG. 2) may use any encryption technique to encrypted consumption data known in the art or discovered in the future. It should be appreciated that the consumption data is encrypted to prevent a malicious user from changing values within the consumption data to gain unauthorized access to the content features (e.g., using a content feature twenty times where the limit is only ten per software license).

The process may arrive at step 612 via step 606 or 612. In step 612, the encryption device (e.g., 200 in FIG. 2) determines whether the duration of the software license duration has expired. In one or more embodiments, the duration refers to the length of time the user is granted access to the software under the software license (e.g., a 90-day trial). In one or more embodiments, the duration may also refer to the length of access granted to specific content features within the software, where each content feature may have varying access durations as defined by the terms of the software licenses. In one or more embodiments, the encryption device (e.g., 200 in FIG. 2) constantly monitors the duration data (i.e., information about the remaining time available on the software license) of the software licenses. In one or more embodiments, the secure license generator (e.g., 206 in FIG. 2) encrypts duration data using one of the methods described above in FIG. 5. It should be appreciated, that the duration data is encrypted to prevent a malicious user from changing values within the duration data to gain access to the software for beyond the duration of the software license. Accordingly, if the result of this determination is YES, the method proceeds to step 614. If the result of the determination is NO, the method may end.

In step 614, the locking ID license file, and all files associated files (e.g., the secure storage, SSVs, etc.) are deleted from the edge device (e.g., 100 in FIG. 1). It should be appreciated, that this will prevent the user from accessing the software associated with the software license beyond the duration of the software license.

In one or more embodiments, the method may end following step 614.

Figure 7:
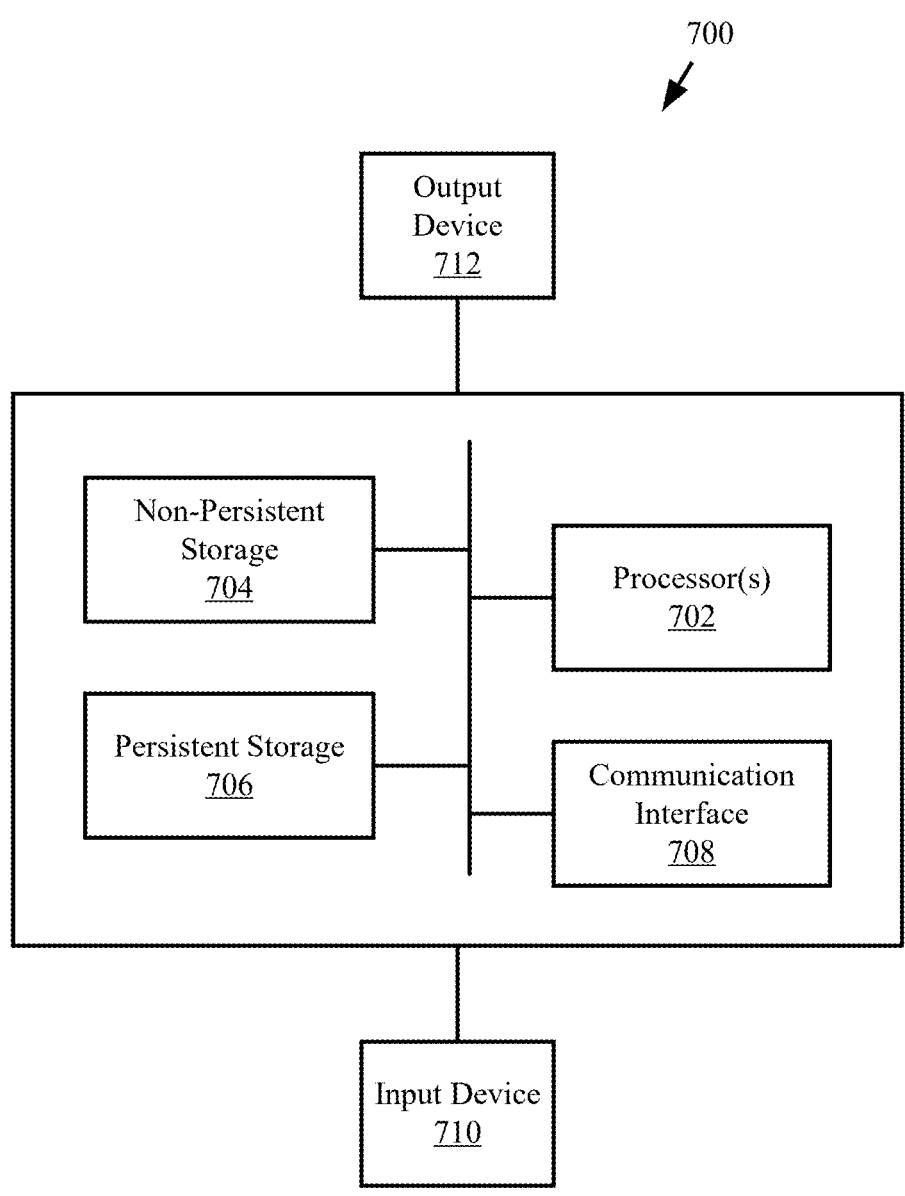
FIG. 7 shows a diagram of a computing device in accordance with one or more embodiments.

Embodiments of the disclosure may be implemented using computing devices. Turning to FIG. 7, FIG. 7 shows a diagram of a computing device (700) in accordance with one or more embodiments. The computing device (700) may include one or more computer processor(s) (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (708) (e.g., Bluetooth interface, infrared interface, network interface, optical interface, etc.), input devices (710), output devices (712), and numerous other elements (not shown) and functionalities. Each of these components is described below.

In one embodiment, the computer processor(s) (702) may be an integrated circuit for processing instructions. For example, the computer processor(s) (702) may be one or more cores or micro-cores of a processor. The computing device (700) may also include one or more input devices (710), such as a touchscreen, keyboard, mouse, microphone, touchpad, electronic pen, or any other type of input device. The communication interface (708) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment, the computing device (700) may include one or more output devices (712), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) (710, 712) may be locally or remotely connected to the computer processor(s) (702), non-persistent storage (704), and persistent storage (706). Many diverse types of computing devices exist, and the aforementioned input and output device(s) (710, 712) may take other forms.

The problems discussed above should be understood as being examples of problems solved by embodiments of the disclosure and the disclosure should not be limited to solving the same/similar problems. The disclosed disclosure is broadly applicable to address a range of problems beyond those discussed herein.

In the detailed description of the embodiments above, numerous specific details are set forth in order to provide a more thorough understanding of one or more embodiments. However, it will be apparent to one of ordinary skill in the art that the one or more embodiments may be practiced without these specific details. In other instances, well-known features have not been described in detail to avoid unnecessarily complicating the description.

In the prior description of the figures, any component described with regard to a figure, in various embodiments, may be equivalent to one or more like-named components described with regard to any other figure. For brevity, descriptions of these components are not repeated with regard to each figure. Thus, each and every embodiment of the components of each figure is incorporated by reference and assumed to be optionally present within every other figure having one or more like-named components. Additionally, in accordance with various embodiments, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, throughout this application, elements of figures may be labeled as A to N. As used herein, the aforementioned labeling means that the element may include any number of items and does not require that the element include the same number of elements as any other item labeled as A to N unless otherwise specified. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

Software instructions in the form of computer readable program code to perform embodiments described herein may be stored, in whole or in part, temporarily or permanently, on a non-transitory computer readable medium such as a CD, DVD, storage device (e.g., 208 in FIG. 2), a diskette, a tape, flash memory, physical memory, or any other physical computer readable storage medium. Specifically, the software instructions may correspond to computer readable program code that, when executed by a processor (s), is configured to perform one or more embodiments described herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing licensed content, the method comprising:
   retrieving an encrypted license file and a pre-shared key (PSK) from a deployment package constructed by a remote device;
   decrypting the encrypted license file using the PSK to obtain license file content;
   sending the decrypted license file content to a secure license generator located at an edge device;
   responsive to a receipt of the decrypted license file content, obtaining a locking ID associated with the edge device;
   encrypting the received license file content using the locking ID to furnish a locking ID license file, wherein the locking ID is usable to access the locking ID license file; and formulating a transformed deployment package that comprises a software product file and the locking ID license file in response to deleting the retrieved PSK and the encrypted license file.

2. The method of claim 1, wherein the method further comprises, prior to receiving the encrypted license file:
   encrypting a license file with the PSK to obtain the encrypted license file; and
   constructing the deployment package with the encrypted license file, the PSK, and the software product file, wherein the software product file is accessible using the license file.

3. The method of claim 2, further comprising:
   initiating the deployment package on the edge device; and
   making, prior to decrypting the encrypted license file, a first determination that the initiating is a first initiating of the deployment package.

4. The method of claim 3, wherein the method further comprises, after deleting the PSK and the encrypted license file:
   performing a second initiation of the deployment package on the edge device;
   making a second determination that the second initiation is not a first initiating of the deployment package;
   retrieving, in response to the second determination, the locking ID license file;
   retrieving license file content from the locking ID license file using the locking ID of the edge device;
   using the software product file in accordance with the license file content;
   making a third determination that use is above a threshold amount of usage;
   generating, in response to the third determination, updated consumption data; and
   encrypting the updated consumption data in the locking ID license file.

5. The method of claim 4, further comprising:
   making a fourth determination that a duration of a license has ended; and
   deleting, in response to the fourth determination, the locking ID license file.

6. The method of claim 4, wherein the threshold amount comprises a predefined use limit of a content feature associated with the software product file.

7. The method of claim 1, wherein the locking ID is based on a media access control (MAC) address of the edge device.

8. A non-transitory computer readable medium (CRM) comprising computer readable program code, which when executed by a computer processor, enables a computer to perform a method for encrypting a licensing file with a locking key, the method comprising, the method comprising:
   retrieving an encrypted license file and a pre-shared key (PSK) from a deployment package constructed by a remote device;
   decrypting the encrypted license file using the PSK to obtain license file content;
   sending the decrypted license file content to a secure license generator located at an edge device;
   responsive to a receipt of the decrypted license file content, obtaining a locking ID associated with the edge device;
   encrypting the received license file content using the locking ID to obtain furnish a locking ID license file, wherein the locking ID is usable to access the locking ID license file; and formulating a transformed deployment package that comprises a software product file and the locking ID license file in response to deleting the retrieved PSK and the encrypted license file.

9. The non-transitory CRM of claim 8, wherein the method further comprises, prior to receiving the encrypted license file:

encrypting a license file with the PSK to obtain the encrypted license file; and constructing the deployment package with the encrypted license file, the PSK, and the software product file, wherein the software product file is accessible using the license file.

10. The non-transitory CRM of claim 9, further comprising:

initiating the deployment package on the edge device; and making, prior to decrypting the encrypted license file, a first determination that the initiating is a first initiating of the deployment package.

11. The non-transitory CRM of claim 9, further comprising:

performing a second initiation of the deployment package on the edge device;

making a second determination that the second initiation is not a first initiating of the deployment package;

retrieving, in response to the second determination, the locking ID license file;

retrieving license file content from the locking ID license file using the locking ID of the edge device;

using the software product file in accordance with the license file content;

making a third determination that use is above a threshold amount of usage;

generating, in response to the third determination, updated consumption data; and encrypting the updated consumption data in the locking ID license file.

12. The non-transitory CRM of claim 11, further comprising:

making a fourth determination that a duration of a license has ended; and deleting, in response to the fourth determination, the locking ID license file.

13. The non-transitory CRM of claim 11, wherein the threshold amount comprises a predefined use limit of a content feature associated with the software product file.

14. The non-transitory CRM of claim 11, further comprising:

making a fifth determination that use is above the threshold amount for all content features associated with the software product file; and deleting, in response to the fifth determination, the locking ID license file.

15. The non-transitory CRM of claim 9, wherein license file content is encrypted using the locking ID and System Stable Values (SSV).

16. The non-transitory CRM of claim 9, wherein the locking ID comprises media access control (MAC) address of the edge device.

17. A method for managing licensed content, the method comprising:

performing an initiation of a deployment package on an edge device, wherein the deployment package comprises a software product file, a locking ID associated with the edge device, and a locking ID license file;

making a first determination that the initiation is not a first initiating of the deployment package;

retrieving, in response to the first determination, the locking ID license file from the initiated deployment package;

retrieving license file content from the locking ID license file using the associated locking ID;

using the software product file in accordance with usage metrics of consumption data associated with each content feature granted by the license file content;

making a second determination to update the consumption data based on the usage of the software product file exceeding a threshold amount;

and encrypting the updated consumption data in the locking ID license file stored in the initiated deployment package on the edge device.

18. The method of claim 17, wherein, prior to receiving the deployment package, the method further comprises:

receiving an encrypted license file and a pre-shared key (PSK) from the deployment package;

decrypting the encrypted license file using the PSK to obtain license file content;

sending the license file content to a secure license generator;

obtaining the locking ID associated with the edge device;

encrypting the license file content using the locking ID to obtain the locking ID license file, wherein the locking ID is usable to access the locking ID license file; and deleting the PSK and the encrypted license file, wherein, based on the deleting, the deployment package comprises the software product file and the locking ID license file.

19. The method of claim 17, further comprising:

making a third determination that a duration of a license has ended; and deleting, in response to the third determination, the locking ID license file.

20. The method of claim 17, further comprising:

making a fourth determination the usage of the software product file is above a threshold amount for all content features associated with the software product file; and deleting, in response to the fourth determination, the locking ID license file.

*  *  *  *  *